Figure 1:

(No Model.)

A. W. CORNWALL.
METHOD OF INSULATING ELECTRIC WIRES AND CABLES.

No. 245,352. Patented Aug. 9, 1881.

Witnesses,
Geo. H. Strong.
Frank A. Brooks

Inventor,
Arthur W. Cornwall
By Dewey & Co.,
Atty's

United States Patent Office.

ARTHUR W. CORNWALL, OF BLACK DIAMOND, CALIFORNIA.

METHOD OF INSULATING ELECTRIC WIRES AND CABLES.

SPECIFICATION forming part of Letters Patent No. 245,352, dated August 9, 1881.

Application filed May 27, 1881. (No model.)

*To all whom it may concern:*

Be it known that I, ARTHUR W. CORNWALL, of Black Diamond, county of Contra Costa, State of California, have invented a Method of Insulating Electric Wires and Cables; and I do hereby declare that the following is a full, clear, and exact description thereof.

My invention relates to the insulation of telegraph and other wires with asbestus; and it consists in weaving or braiding on the wire a covering of asbestus which has been spun into threads or mixed with other substances, thus wrapping or winding the same, and finally coating it with asbestus paint, so as to hermetically seal the wire within a non-conducting and indestructible casing.

Referring to the accompanying drawing for a more complete description of my invention, the figure shows a wire with its inclosing casing woven or wound upon it.

An objection to laying telegraph-wires under ground, where they would be less in the way and better protected, is the difficulty and expense of insulating them. This I overcome by using threads which are spun from asbestus, and forming a covering for the wire with them. To do this the wire is passed through a machine which may be made to work similarly to a whip-braiding machine, and these threads of asbestus are braided about the wire so as to form a continuous covering. I then wind the asbestus threads about the wire, and finally treat the braided and wound wire with a coating of asbestus paint. This renders the wire impervious to moisture and completely insulates it, so that it may be laid beneath the surface of the ground, where it will remain without deterioration. When the preparation of the wire has been completed it may be coiled, and will then be ready for use, as its flexibility will not be affected by the process.

I am aware that asbestus threads have heretofore been braided around wire for the purposes of insulation, and therefore I make no claim to the use of asbestus, broadly, but confine myself to my precise method, as hereinbefore set forth.

Having thus described my invention, what I claim as new, and desire to secure by Letters Patent, is—

The method of insulating telegraph wires or cables, consisting in first weaving or braiding with asbestus threads, then wrapping or winding with the same, and finally coating with asbestus paint, substantially as herein described.

In witness whereof I have hereunto set my hand.

ARTHUR W. CORNWALL.

Witnesses:
  GEO. H. STRONG,
  S. H. NOURSE.